E. BUSSEY.
Stove Top.

No. 113,492.

Patented Apr. 11, 1871.

Witnesses.
Richard N. Reille
Thos. M. Austin

Inventor.
Esek Bussey

United States Patent Office.

ESEK BUSSEY, OF TROY, NEW YORK.

Letters Patent No. 113,492, dated April 11, 1871.

IMPROVEMENT IN HEATING-STOVES.

The Schedule referred to in these Letters Patent and making part of the same.

I, ESEK BUSSEY, of the city of Troy, county of Rensselaer, and State of New York, have invented a new and useful Improvement in Stoves, of which the following is a specification.

My invention relates more particularly to that class of heating-stoves having a pan, or its equivalent, in the top, over which is a cover or grating, pivoted or otherwise arranged as to be readily removable, uncovering and exposing the pan when required.

Similar pans have been heretofore provided with holes, one or more, for the reception and rapid heating of culinary-vessels, the said holes provided with covers for closing them.

Pans also have been made removable by being lifted out and away from the stove, and also by being hinged so as to be easily thrown back, standing vertically on edge, to expose the interior of the stove.

In such arrangement it has always been necessary to remove the covers of the boiler holes by lifting them out and away from the stove, each one separately, taking time and trouble. To obviate this necessity is the object of my invention, which consists definitely in constructing the said covers in such manner and in such combination with the said pan that when the pan is thrown back and standing on edge the covers closing the boiler-holes will keep their position with regard to the pan, as before.

Description of the Accompanying Drawing.

Figure 1:
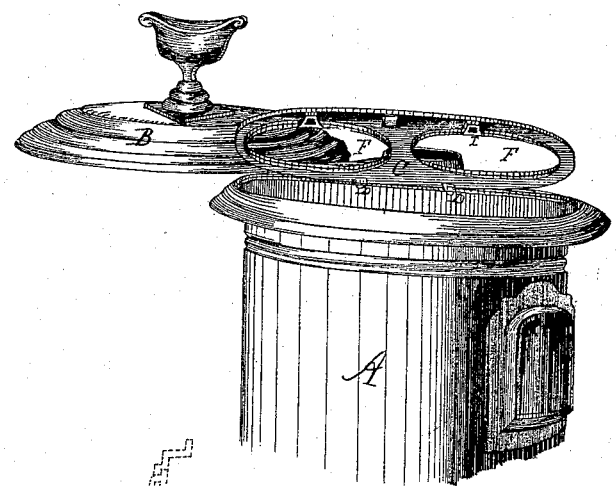
Figure 1 is a perspective view of the upper portion of a heating-stove having my improvement, cover thrown back, pan raised partly.
Figure 2:
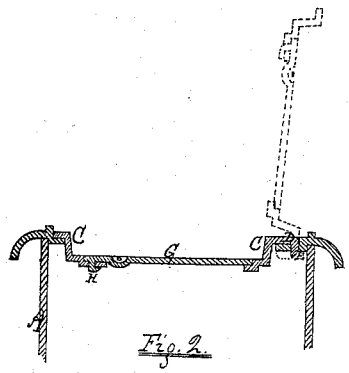
Figure 2 is a vertical section from front to rear of the stove, dotted lines showing the position of the pan when thrown back.
Figure 3:
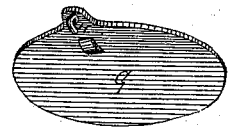
Figure 3 is a perspective view of the cover alone, and from underneath.
Figure 4:
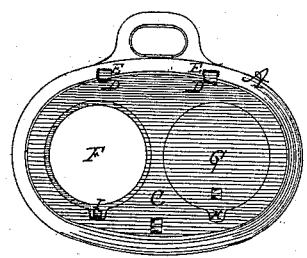
Figure 4 is a horizontal view of the pan and top of stove, one cover removed, boiler-hole exposed.

General Description.

A represents the body of stove.

B represents the top cover, which is constructed as usual, and pivoted to the stove top so as to be readily, by a sliding motion, removed, to uncover the pan.

C represents the pan, constructed as usual, of any suitable depth, and having hook-lugs at the back, passing through corresponding eye-slots in such manner that they answer as hinges, allowing the pan to stand on edge vertically, and also admitting the removal of the pan entirely from the stove, if required.

The hook-lug forms a part of the pan, and the eye-slot is through any plate of the stove to which it may be desirable to attach the pan.

The hook-lugs are marked D and the eye-slots E.

At F is shown the boiler-holes through the pan; and

G represents the covers for closing the same.

The covers G have each a hook-lug at H, cast as a part thereof; and at

I are shown corresponding eye-slots, in and through the pan, through which the hook-lugs H pass in such manner that when the pan is thrown back, resting on its rear edge vertically, the hook-lugs of the covers in the eye-slots of the pan will prevent the covers G from being thrown off, and holding them in about the same position with regard to the pan as when horizontal.

It will be seen that the hook-lugs D of the pan, and the eye-slots E of the stove-plate, when combined, perform the duties of the hinges, while the hook-lugs H of the boiler-hole covers, and the eye-slots I of the pan, answer the purpose of retaining the covers in combination with the pan when the pan is raised to a vertical position. While the pan rests horizontally, covering the interior of the stove, if it becomes necessary to remove the cover G to place a culinary-vessel over the fire, it is readily removable with any ordinary lifter, in the usual manner.

The shape or form of the pan and covers, also the material of which they are composed, may be as suitable and convenient, and my invention is applicable to any style of stove where it may be useful and desirable.

What I claim, and desire to secure by Letters Patent of the United States, is—

The cover G, provided with the hook-lug H, in combination with the pan C, when operating therewith, as and for the purpose described.

ESEK BUSSEY.

Witnesses:
RICHARD H. REILLE,
CHAS. M. AUSTIN.